(No Model.) 2 Sheets—Sheet 1.

R. WOOD.
VALVE.

No. 473,488. Patented Apr. 26, 1892.

Witnesses
H. A. Carhart.
C. B. Kunce

Inventor
Robert Wood
By his Attorneys
Smith & Denison

UNITED STATES PATENT OFFICE.

ROBERT WOOD, OF SYRACUSE, NEW YORK.

VALVE.

SPECIFICATION forming part of Letters Patent No. 473,488, dated April 26, 1892.

Application filed March 16, 1891. Serial No. 385,214. (No model.)

*To all whom it may concern:*

Be it known that I, ROBERT WOOD, of Syracuse, in the county of Onondaga, in the State of New York, have invented new and useful Improvements in Valves, of which the following, taken in connection with the accompanying drawings, is a full, clear, and exact description.

My invention relates to the water-inlet valves connected to or embodied in a piping system for fire-sprinklers and other purposes wherever a check-valve is needed to balance counter-pressure of different strengths on one side sufficient to overcome the water-pressure upon the other, the water being admitted to the piping from the main whenever the pressure is reduced on the opposite side from any cause.

My object is to provide a valve combining in one a stop, a check, an alarm, and an indicator-valve, in which the valve proper is detached from the main stem, but is guided in its vertical movements by an auxiliary stem or guide-rod upon the valve engaging with the main stem, in which the main stem is provided with an indicator, which indicates visually whether the valve is closed tight by the engagement of the main stem therewith or whether this main stem is disengaged therefrom, so that the water-pressure in the water-main can open it whenever the pressure on top of the valve is from any cause reduced below that of the head of the water upon the other side, and which is provided with means to sound an alarm whenever the valve is raised sufficiently to make an electrical circuit by its contact with suitable wiring.

My invention consists in the several novel features of construction hereinafter described, and which are specifically set forth in the claims hereunto annexed.

It is constructed as follows, reference being had to the accompanying drawings, in which—

Figure 1:
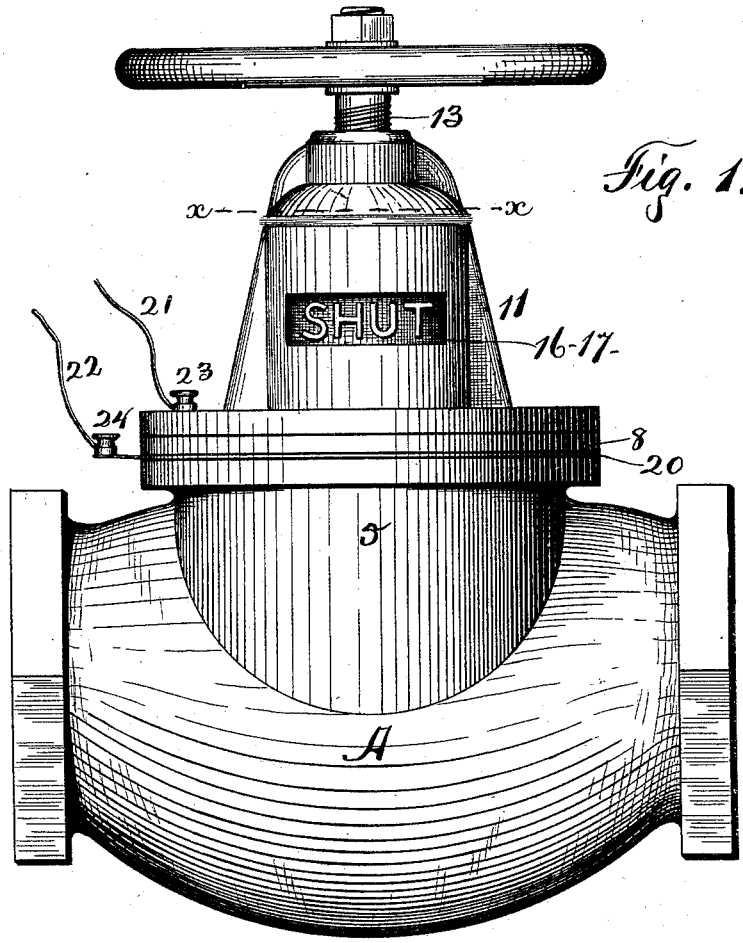
Figures 3, 4:
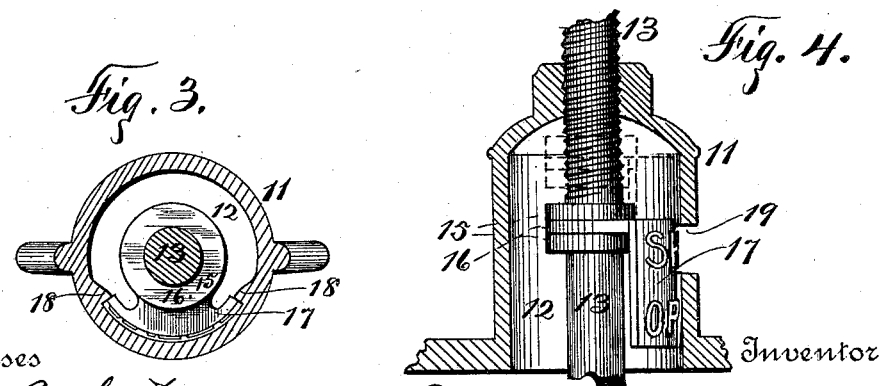
Figure 2:
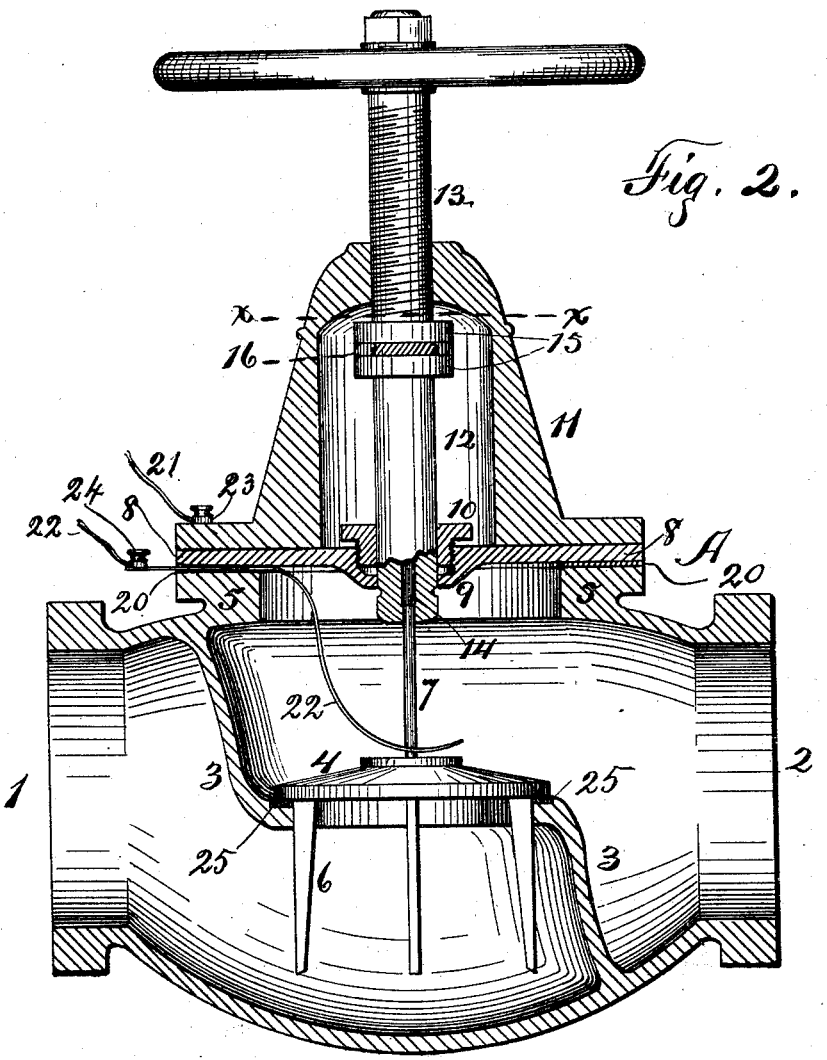

Figure 1 is a side elevation of the valve complete. Fig. 2 is a vertical longitudinal section of the same, showing the valve in elevation and the main stem partly in elevation and partly in section. Fig. 3 is a horizontal transverse section on line *x x* in Figs. 1, and 3. Fig. 4 is a vertical transverse sectional elevation on a line at a right angle to the section-line of Fig. 2.

A is the main casing, of substantially the form shown in the drawings. 1 is the inlet-opening in one end. 2 is the outlet-opening where it is connected to the piping system. (Not shown.) 3 is the partition provided with a suitable seat for the valve 4, and 5 is the tubular shank integral with the body. The valve 4 consists of a disk provided with the downwardly-projecting guide-fingers 6, which stand close to the vertical walls of the valve-seat opening in the partition 3, and with a central vertical auxiliary stem or guide-rod 7, projecting above the valve. A horizontal plate 8 closes the top of the tubular shank and is provided with a central depression 9, adapted to receive the stuffing-box 10. A cap 11, having cylindrical recess 12, is secured upon the plate 8, and the threaded portion of the main valve-stem 13 fits through the top of this cap and extends down through the stuffing-box, substantially as shown, and it is provided with a central opening 14, which freely receives the auxiliary stem or guide-rod 7, and is deep enough to take in the whole thereof. This guide-rod constitutes the sole connection of the main stem to the valve. Upon the main stem 13 I secure two collars 15, between which the disk 16 fits, which disk carries on one side the vertical plate 17, having a curve concentric with the recess 12. This plate fits between the side stops 18 in the recess, which prevents its rotation with the rotation of the main valve-stem, yet permits it to be raised or lowered by the main valve-stem. Upon the exterior of this plate I mount the words "Shut" and "Open," as shown, or with any other characters, signs, or symbols in place thereof for the same purpose.

In the cap 11 I cut a horizontal slot 19, through which the words "Shut" and "Open" are visible, according to the position of the valve-stem. Thus when the main stem is raised out of contact with the valve, as in Fig. 2, then the word "Open" appears in the slot, which indicates that the full pressure is on in the piping and that when it is reduced the water-pressure will open the valve and let on the water, and when the main stem is screwed down until its lower end is in contact with the top of the valve then the plate is lowered, as in Fig. 4, so that the word "Shut" will appear in the slot.

Non-conducting packing 20 is placed between the valve-body and the plate 8, so that the cap is insulated from the body at that point. The valve is also insulated from the partition by a packing 25.

The wires 21 and 22 are connected to a battery and to an alarm mechanism, (not shown,) the wire 21 being connected to the binding-post 23 upon the cap 11, and through the cap, the plate 8, the stuffing-box, the main valve-stem, and the auxiliary stem or guide-rod the valve becomes one pole. The other wire 22 is connected to the binding-post 24, and is thence conducted through the insulating material or packing 20 into the body, where the free end hangs flexibly in proximity to the valve when it is closed, and when the valve is raised and strikes the wire a circuit is made, so that an alarm is given, giving warning that the water has opened the valve, because the pressure in the piping system has become reduced for some cause or other.

When the main stem is screwed down upon the valve, then the whole device is a stop-valve.

What I claim as my invention, and desire to secure by Letters Patent, is—

1. The combination, with the valve-casing constructed with a partition having a valve-opening and with a tubular shank, a valve, a cap, and a valve-stem, of the binding-post secured to the cap, the non-conducting packing on the shank, the non-conducting packing around the valve-opening, the wire connected with the binding-post and with the cap, and the wire extending through the packing on the shank and into the body of the casing, where its free end hangs flexibly in proximity to the valve, substantially as described.

2. The combination, with the valve-casing constructed with a partition having a valve-opening and with a tubular shank, a valve, a cap, and a valve-stem, of the binding-post secured to the cap, the non-conducting packing on the shank, the horizontal plate having a central depression, the stuffing-box in the depression, the non-conducting packing around the valve-opening, the wire connected with the binding-post and with the cap, and the wire extending through the packing on the shank and into the body of the casing, where its free end hangs flexibly in proximity to the valve, substantially as described.

In witness whereof I have hereunto set my hand this 29th day of December, 1890.

ROBT. WOOD.

In presence of—
HOWARD P. DENISON,
C. B. KINNE.